United States Patent Office 3,151,132
Patented Sept. 29, 1964

3,151,132
POLYHALOMETHYL PREGNENES
Albert Bowers and John Edwards, Mexico City, Mexico, assignors, by mesne assignments, to Syntex Corporation, a corporation of Panama
No Drawing. Filed Oct. 18, 1960, Ser. No. 63,266
Claims priority, application Mexico July 2, 1960
15 Claims. (Cl. 260—397.3)

The present invention relates to novel cyclopentanophenanthrene compounds and to a novel process for the production thereof.

More particularly the present invention relates to the novel 16α-monofluoromethyl, 16α-difluoromethyl and 16α-trifluoromethyl derivatives of Δ⁴-pregnene-3,20-dione and of Δ⁵-pregnen-3β-ol-20-one, to esters thereof and to a novel process for the preparation thereof.

The novel compounds of the present invention are useful as hypnotic agents and in the treatment of premenstrual tension as well as possess anti-fungal and anti-bactericidal properties. In addition, the novel compounds are valuable intermediates for the preparation of the novel progestational and cortical hormones having a trifluoromethyl group, difluoromethyl group or monofluoromethyl group at C–16 as described in copending applications Serial No. 63,265, and Serial No. 63,267 filed of even date.

The novel compounds of the present invention may be represented by the following formulas:

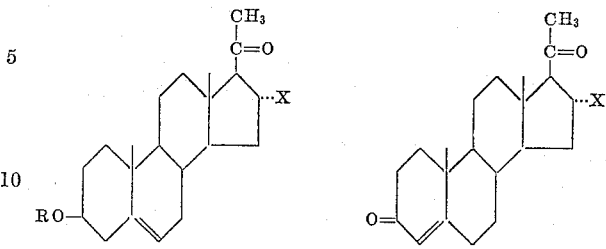

In the above formulas, X represents the monofluoromethyl, difluoromethyl or trifluoromethyl group, and R represents hydrogen or the acyl group of a hydrocarbon carboxylic acid of less than 12 carbon atoms, saturated or unsaturated, of straight, branched, cyclic or cyclic-aliphatic chain, aromatic and may be substituted by functional groups such as hydroxy, acyloxy of up to 8 carbon atoms, alkoxy of up to 5 carbon atoms, amino, nitro or halogen. Typical ester groups are the acetate, propionate, butyrate, enanthate, trimethylacetate, t-butylacetate, phenoxyacetate, cyclopentylpropionate aminoacetate and β-chloropropionate.

The novel compounds of the present invention may be prepared by a process illustrated by the following equation (for the C–16-trifluoromethyl compounds):

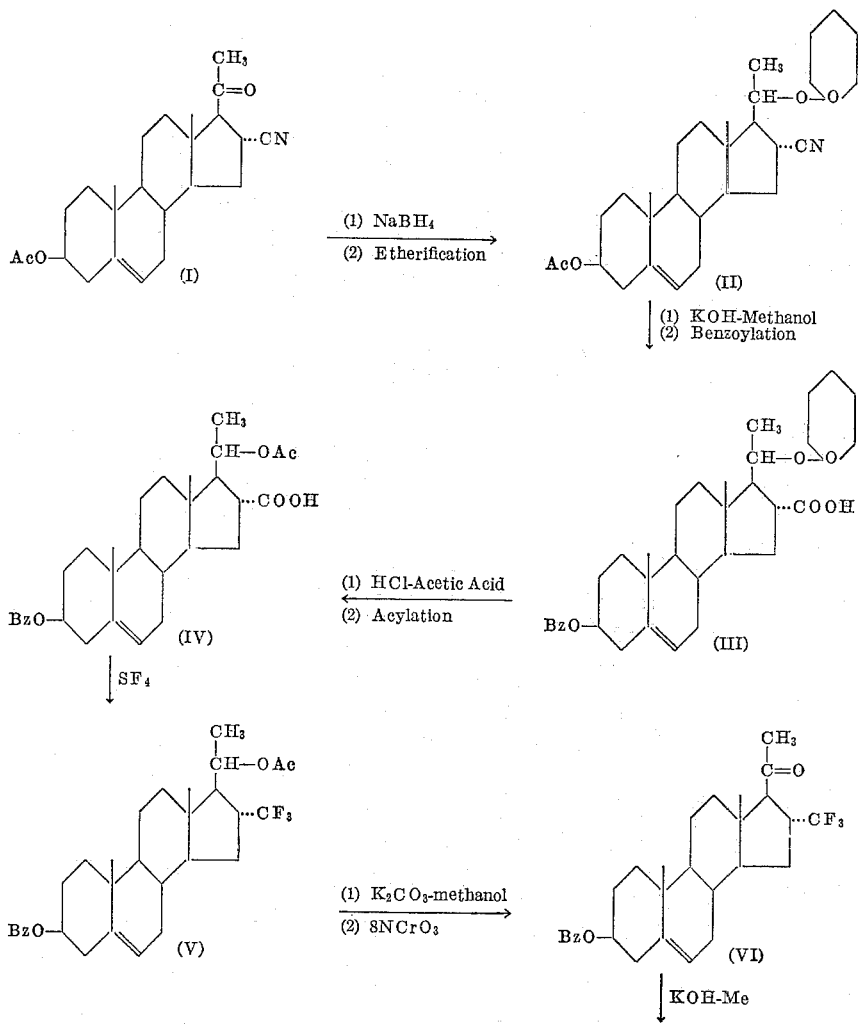

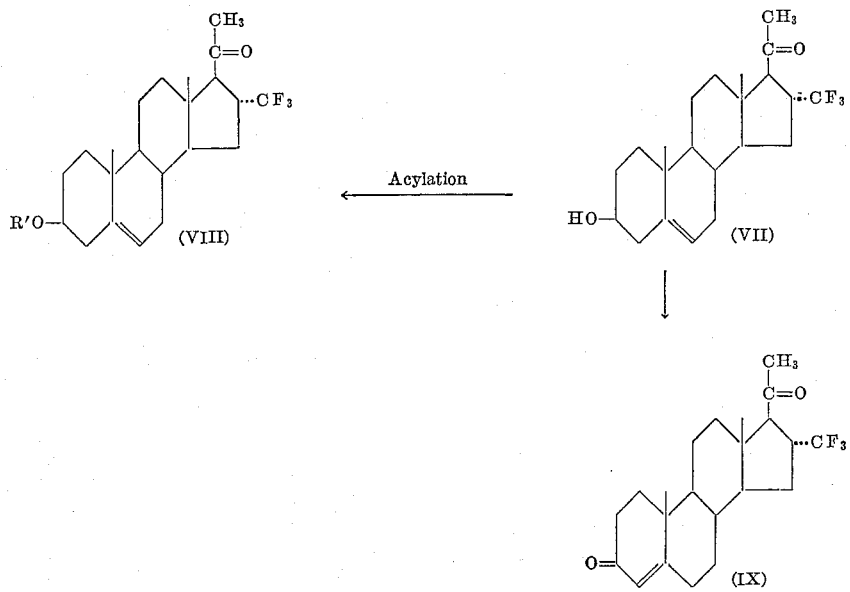

In the above equation, Ac represents acetyl but other acyl groups derived from the hydrocarbon carboxylic acids described heretofore may be employed; Bz represents the benzoyl radical and R' represents the acyl group of a hydrocarbon carboxylic acid of the type heretofore described.

In practicing the process outlined above, 16α-cyano-Δ⁵-pregnen-3β-ol-20-one acetate (I), described by J. Romo, Tetrahedron 3, 37 (1958), is reacted with sodium borohydride to reduce the C–20 keto group to the C–20 hydroxyl group which is then etherified by reaction with dihydropyran in benzene solution and in the presence of p-toluenesulfonic acid. The thus formed 20β-tetrahydropyranyloxy-16α-cyano-Δ⁵-pregnen-3β-ol acetate (II) is then hydrolyzed by refluxing with methanolic potassium hydroxide, followed by benzoylation as by conventional reaction with benzoyl chloride in pyridine solution to afford 3-benzoyloxy-20β-tetrahydropyranyloxy-Δ⁵-pregnen-16α-carboxylic acid (III). Hydrolysis of the ether group as by reaction of the latter compound in acetic acid with dilute hydrochloric acid, followed by acylation, particularly acetylation, of the thus formed C–20β-alcohol by conventional means, affords 3β-benzoyloxy-20β-acetoxy - Δ⁵ - pregnene - 16β - carboxylic acid (IV). Upon heating the latter compound in benzene solution at 145° C. in a sealed tube for a period of time in the order of 5 hours or keeping at room temperature for 96 hours, there is formed 16α-trifluoromethyl-Δ⁵-pregnene-3β,20β-diol-3-benzoate-20-acetate (V). The acetate group is saponified by treatment with methanolic potassium carbonate, followed by oxidation of the thus formed C–20 hydroxyl group with 8 N chromic acid to produce 16α-trifluoromethyl-Δ⁵-pregnen-3β-ol-20-one benzoate (VI), which upon saponification with methanolic potassium hydroxide is converted into 16α-trifluoromethyl-Δ⁵-pregnen-3β-ol-20-one (VII). By reaction with hydrocarbon carboxylic acid anhydrides or chlorides of less than 12 carbon atoms, there are formed the corresponding esters of the aforementioned 16α-trifluoromethyl-Δ⁵-pregnen-3β-ol-20-one (VIII). Oxidation of 16α-trifluoromethyl-Δ⁵-pregnen-3β-ol-20-one, under Oppenauer conditions gives 16α-trifluoromethyl progesterone (IX).

The preparation of the novel compounds of the present invention having a difluoromethyl group at C–16α are produced by a process illustrated by the following equation:

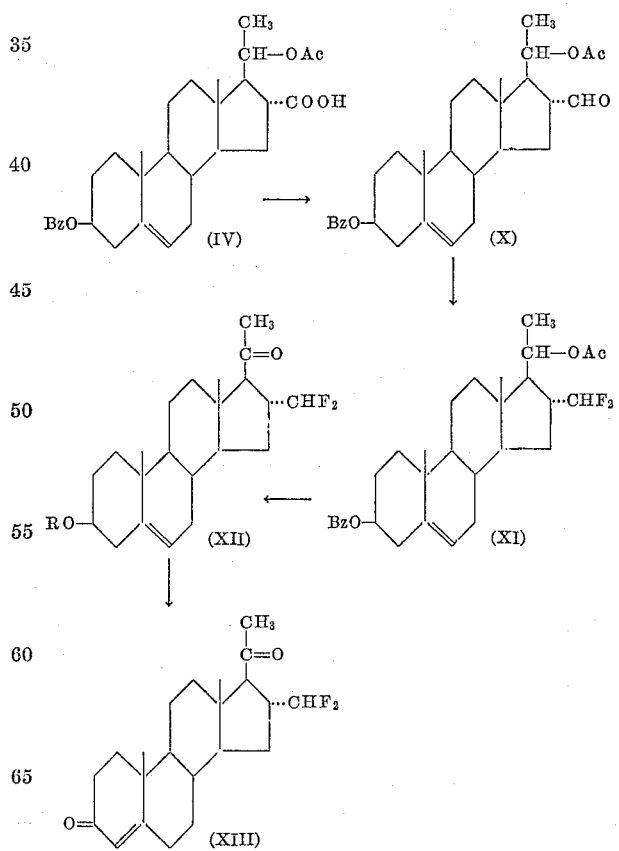

In the above formulas, Bz, Ac and R have the same meaning as set forth above.

In carrying out the process outlined above, 3-benzoyloxy-20β-acetoxy-Δ⁵-pregnene-16β-carboxylic acid (IV) is treated with oxalyl chloride or thionyl chloride followed by reduction of thus formed acid chloride with lithium aluminum tertiary butoxide in tetrahydrofuran at —75° or by the method of Rosenmund to form the 3-benzoate-20-acetate of Δ⁵-pregnene-3β,20β-diol-16α-carboxaldehyde (X). The latter compound is then reacted with a large excess of sulfur tetrafluoride in benzene solution for a period of time in the order of 48 hours to effect replacement of the 16α-carboxaldehyde group by the difluoromethyl group and thus form 16α-difluoromethyl-Δ⁵-pregnene-3β,20β-diol-3-benzoate - 20 - acetate (XI). The acetate group is preferentially saponified as by treatment with methanolic potassium carbonate followed by oxidation of the thus formed C–20 alcohol with 8 N chromic acid to provide 16α-difluoromethyl-Δ⁵-pregnen-3β-ol-20-one benzoate (XII: R=benzoyl), which upon saponification with methanolic potassium hydroxide is converted into 16α-difluoromethyl-Δ⁵-pregnen-3β-ol-20-one (XII: R=H). The latter compound is subjected to oxidation under Oppenauer conditions to thus form 16α-difluoromethyl progesterone (XIII).

The preparation of the novel compounds of the present invention having a monofluoromethyl group at C–16α is illustrated by the following equation:

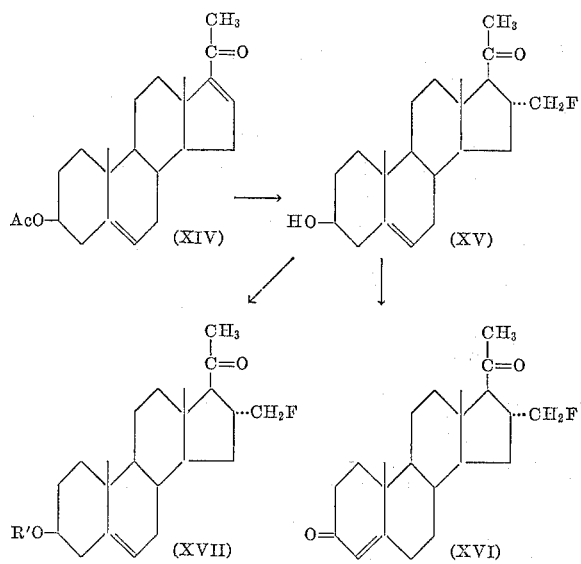

In the above equation, Ac and R' have the same meaning as previously described.

In practicing the process outlined above, 3β-acetoxy-Δ⁵,¹⁶-pregnadien-20-one (XIV) is reacted with an excess of a monofluoromethyl magnesium halide, preferably monofluoromethyl magnesium iodide, in a solvent such as tetrahydrofuran or diethyl ether in the absence or presence of a catalyst such as cuprous chloride at a temperature in the order of —30° C. to 20° C., preferably between —20° C. and —10° C. for a period of time ranging from 30 minutes to 2 hours. The reaction mixture is then treated with aqueous ammonium chloride and there is formed with simultaneous hydrolysis of the acetoxy group 16α-monofluoromethyl-Δ⁵-pregnen-3β-ol-20-one (XV), which upon oxidation under Oppenauer conditions is converted into 16α-monofluoromethyl-progesterone (XVI).

By the reaction of 16α-monofluoromethyl-Δ⁵-pregnen-3β-ol-20-one (XV) with hydrocarbon carboxylic acid anhydrides of less than 12 carbon atoms, there are formed the corresponding esters (XVII).

By substituting the monofluoromethyl magnesium halide by trifluoromethyl magnesium halide in the above process, which is disclosed in our copending application Serial No. 63,265, filed of even date, there are formed 16α-trifluoromethyl-Δ⁵-pregnen-3β-ol-20-one, the esters thereof and 16α-trifluoromethyl-progesterone.

Alternatively the novel compounds of the present invention having a monofluoromethyl group at C–16α may be prepared by a process illustrated by the following equation:

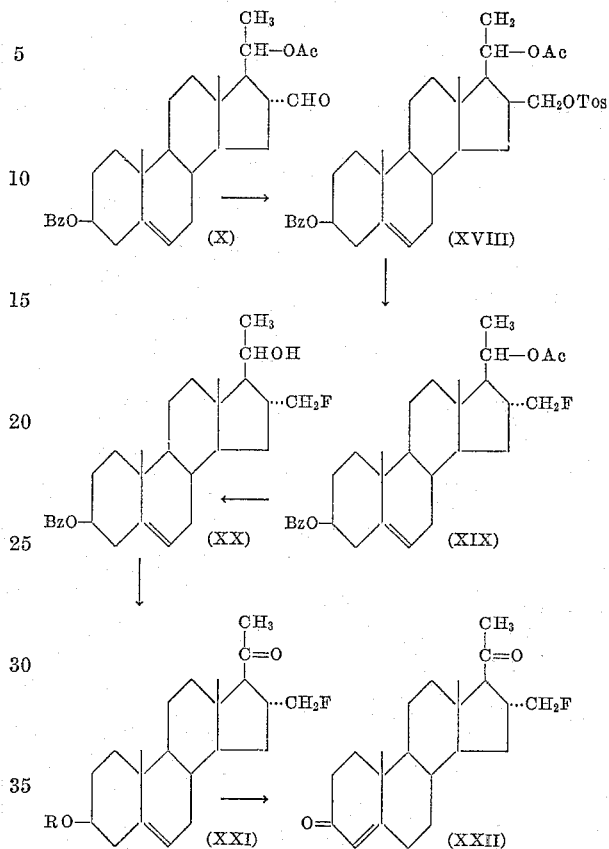

In the above formulas Ac, Bz and R have the same meaning as previously set forth; Tos represents the tosyl radical.

In practicing the process just outlined, the 3-benzoate-20-acetate of Δ⁵-pregnene-3β,20β-diol-16α-carboxaldehyde (X) is treated with sodium borohydride to effect reduction of the aldehyde group and thus form the 3-benzoate-20-acetate of 16α-hydroxymethyl-Δ⁵-pregnene-3β,20-diol. Upon treatment with p-toluenesulfonic acid chloride in pyridine solution, the tosylate XVIII is formed which upon reaction with an alkali metal fluoride such as potassium hydrogen fluoride in dimethylformamide solution is converted into the 3-benzoate-20-acetate of 16α-monofluoromethyl-Δ⁵-pregnene-3β,20β-diol (XIX). The acetoxy moiety at C–20 is preferentially hydrolyzed as by treatment with potassium carbonate to form the 3-benzoate of 16α-monofluoromethyl-Δ⁵-pregnene-3β,20β-diol (XX) which is then oxidized with 8 N chromic acid to produce the 3-benzoate of 16α-monofluoromethyl-Δ⁵-pregnen-3β-ol-20-one. Upon saponification with methanolic potassium hydroxide the latter compound is converted into 16α-monofluoromethyl-Δ⁵-pregnen-3β-ol-20-one (XXI: R=H) which can be reesterified with hydrocarbon carboxylic acid anhydrides to form other esters thereof (XXI: R=acyl). Oxidation of 16α-monofluoromethyl-Δ⁵-pregnen-3β-ol-20-one (XXI:R=H) under Oppenauer conditions gives 16α-monofluoromethyl-progesterone (XXII).

The following examples serve to illustrate but are not intended to limit the scope of the present invention:

*Example I*

To 1.0 g. of 16α-cyano-Δ⁵-pregnen-3β-ol-20-one acetate in 50 cc. of dioxane was added 500 mg. of sodium borohydride in a mixture of 1 cc. of water and 9 cc. of dioxane. After standing at room temperature for 2 hours, water was added to the reaction mixture and the product that separated was filtered. This product, without further purification, was dissolved in 150 cc. of benzene containing 3 cc. of dihydropyran and 250 mg. of p-toluenesulfonic acid. After 20 hours at room temperature the benzene solution was washed with 5% sodium carbonate solution and finally with water. Removal of the solvent and crystallization from aqueous methanol afforded 3β-acetoxy - 20β - tetrahydropyranyloxy-16α-cyano-Δ⁵-pregnene.

*Example II*

1.0 g. of the above compound was refluxed for 10 hours with 50 cc. of 4% methanolic potassium hydroxide solution and then neutralized with acetic acid. Removal of the solvent under reduced pressure afforded 20β-tetrahydropyranyloxy - Δ⁵ - pregnen-3β-ol-16α-carboxylic acid which was used for the next step without further purification.

*Example III*

The above compound in 10 cc. of pyridine was treated with an excess of benzoyl chloride and allowed to remain at room temperature for 16 hours to finally furnish 3β-benzoyloxy - 20β-tetrahydropyranyloxy-Δ⁵-pregnene-16α-carboxylic acid.

*Example IV*

A mixture of 1.5 g. of the above compound in 50 cc. of acetic acid containing 5 cc. of 2 N hydrochloric acid was allowed to stand at room temperature for 5 hours to effect hydrolysis of the tetrahydropyranyl ether group and thus yield 3β-benzoyloxy-20β-hydroxy-Δ⁵-pregnene-16α-carboxylic acid.

Acetylation of the free 20β-hydroxyl group was effected in pyridine solution with acetic anhydride at room temperature for 16 hours to finally furnish 3β-benzoyloxy-20β-acetoxy-Δ⁵-pregnene-16α-carboxylic acid.

*Example V*

2 g. of the above compound in 50 cc. of dry dioxane was placed in a steel tube and cooled to −75° C. 2 g. of sulfur tetrafluoride was then added and the tube was sealed by means of a steel screw cap. The tube and contents were then heated at 145° C., for 5 hours, or preferably maintained for 96 hours at room temperature (20° C.). After cooling, the contents were poured into water and the product was isolated by extraction with ethyl acetate. Chromatography over alumina afforded 16α-trifluoromethyl-Δ⁵-pregnene-3β,20β-diol-3-benzoate-20-acetate.

*Example VI*

The above compound was preferentially hydrolyzed at C–20 by adding 1 molar equivalent of potassium carbonate dissolved in a little water to a solution of the above compound in methanol. The reaction mixture was kept at room temperature with stirring for 16 hours, at the end of which, water was added, the mixture filtered and the product was chromatographed over alumina to yield 3β-benzoyloxy-16α-trifluoromethyl-Δ⁵-pregnen-20β-ol.

*Example VII*

A solution of 2 g. of the above compound in 100 cc. of acetone was cooled to 0° C. and treated under an atmosphere of nitrogen with stirring with a solution of 8 N chromic acid until the color of the reagent persisted in the mixture. The oxidizing agent had been prepared by dissolving 26.7 g. of chromium trioxide in 23 cc. of concentrated sulfuric acid and diluting with water to 100 cc.; the mixture was then stirred for 10 minutes more at room temperature, diluted with water and the precipitate was collected, washed with water, dried and recrystallized from ether, thus affording 16α-trifluoromethyl-3β-benzoyloxy-Δ⁵-pregnen-20-one.

*Example VIII*

The above compound was subjected to hydrolysis by treatment with 1% methanolic potassium hydroxide solution under reflux for 2½ hours to furnish 16α-trifluoromethyl-Δ⁵-pregnen-3β-ol-20-one.

Reesterification of the hydroxyl group by conventional methods yielded the acetate, propionate and enanthate.

*Example IX*

A solution of 3 g. of 16α-trifluoromethyl-Δ⁵-pregnen-3β-ol-20-one in 20° cc. of toluene and 50 cc. of cyclohexanone was dried by distilling off 30 cc. of the solvent. A solution of 3 g. of aluminum isopropoxide dissolved in 20 cc. of anhydrous toluene was then added and the mixture was refluxed for 45 minutes; 10 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated until crystallization started. There was thus obtained 16α-trifluoromethylprogesterone.

*Example X*

A mixture of 1 g. of 3β-benzoyloxy-20β-acetoxy-Δ⁵-pregnene-16α-carboxylic acid, obtained as described in Example IV and 5 cc. of oxalyl chloride was refluxed under anhydrous conditions during 2 hours. The solution was evaporated in vacuum, 2 portions of dry benzene were added and reevaporated to eliminate traces of oxalyl chloride. The above crude acid chloride was dissolved in 20 cc. of anhydrous tetrahydrofuran, cooled to −75° C. in a Dry Ice-acetone bath and treated with a previously cooled solution of 600 mg. of lithium aluminum t-butoxide in 20 cc. of anhydrous tetrahydrofuran. The reaction mixture was kept at −75° C. for 1 hour and then at room temperature for 30 minutes, poured into ice water and extracted several times with ethyl acetate, washed with water to neutral, dried over anhydrous sodium sulfate and evaporated to dryness under vacuum. After chromatography there was obtained the 3-benzoate-20-acetate of Δ⁵-pregnene-3β,20β-diol-16α-carboxaldehyde.

A solution of 500 mg. of the above aldehyde in 100 cc. of benzene was treated with 1 g. of sulfur tetrafluoride and the mixture kept in a sealed steel tube for 48 hours at room temperature, it was then poured carefully into ice water. An excess of sodium bicarbonate was added and the product extracted with methylene chloride. The extract was washed with water to neutral, dried and evaporated to dryness. After chromatography and crystallization of the solid fractions from acetone-hexane there was obtained 16α-difluoromethyl-Δ⁵-pregnene-3β,20β-diol-3-benzoate-20-acetate.

For the next step there were combined several batches of the above compound.

*Example XI*

A solution of 5 g. of 16α-difluoromethyl-Δ⁵-pregnene-3β,20β-diol-3-benzoate-20-acetate in 200 cc. of methanol was treated with 2.5 g. of potassium carbonate dissolved in 20 cc. of water and the mixture kept at room temperature for 12 hours. The reaction mixture was neutralized with acetic acid and concentrated under vacuum to one-third its volume, poured into water, the formed precipitate filtered, washed with water to neutral and dried, thus giving 16α-difluoromethyl-Δ⁵-pregnene-3β,20β-diol-3-benzoate.

The above crude product was dissolved in 100 cc. of acetone, cooled to 0° C. and treated dropwise under an atmosphere of nitrogen under stirring with an 8 N chromic acid solution (prepared as in Example VII) until the color of the reagent persisted in the mixture, stirred for 10 minutes further at room temperature, diluted with water and the precipitate collected, washed with water and dried under vacuum, thus affording 16α-difluoromethyl-Δ⁵-pregnen-3β-ol-20-one benzoate.

The crude benzoate was dissolved in 75 cc. of methanol and refluxed for 3 hours with 2 g. of potassium hydroxide, it was then poured into ice water, the precipitate collected, washed with water to neutral, dried and recrystallized from ethyl acetate-ether, thus giving 3.5 g. of 16α-difluoromethyl-Δ⁵-pregnen-3β-ol-20-one.

Conventional esterification of the above compound with the corresponding acid anhydrides or chlorides in pyridine solution gave the acetate, propionate and cyclopentylpropionate.

*Example XII*

By following the method of Example IX, 5 g. of 16α-difluoromethyl-Δ⁵-pregnen-3β-ol-20-one were oxidized under Oppenauer conditions thus giving 16α-difluoromethyl-progesterone.

*Example XIII*

To 150 cc. of tetrahydrofuran containing 3 g. of monofluoromethylmagnesium iodide was added a solution of 5 g. of the acetate of Δ⁵,¹⁶-pregnadien-3β-ol-20-one in 50 cc. of tetrahydrofuran and 0.7 g. of cuprous chloride. The addition was effected under stirring, over a period of 30 minutes, under an atmosphere of nitrogen and at a temperature between −20° C. and −10° C. The mixture was stirred for a further 2 hours at 0° C. There was then added 100 cc. of aqueous saturated ammonium chloride solution, the tetrahydrofuran was distilled and the aqueous residue extracted several times with ether. The extract was washed with water, dried over anhydrous sodium sulfate and the ether was evaporated. There was thus obtained 16α-monofluoromethyl-Δ⁵-pregnen-3β-ol-20-one. Oppenauer oxidation of the above compound, in accordance with the method of Example IX gave 16α-monofluoromethyl-progesterone. (The monofluoromethyl magnesium iodide was prepared by treating fluoroiodomethane, described by Arkel and Janetsky, Rec. Trav. Chim. 56, 167 (1937), with magnesium according to the method described by Haszeldine, J. Chem. Soc. 1275 (1954)).

*Example XIV*

A solution of 1 g. of 16α-monofluoromethyl-Δ⁵-pregnen-3β-ol-20-one in 5 cc. of pyridine and 3 cc. of propionic anhydride was allowed to stand at room temperature overnight, the reaction mixture poured into ice water and the formed precipitate collected by filtration, washed with water and dried. There was thus obtained the propionate of 16α-monofluoromethyl-Δ⁵-pregnen-3β-ol-20-one.

In a similar manner, but using the corresponding acid anhydrides or chlorides there were obtained the acetate, caproate, benzoate and cyclopentylpropionate of 16α-monofluoromethyl-Δ⁵-pregnen-3β-ol-20-one.

*Example XV*

A solution of 500 mg. of sodium borohydride in 2 cc. of water was added to a solution of 2 g. of the 3-benzoate-20-acetate of Δ⁵-pregnene-3β,20β-diol-16α-carboxaldehyde obtained as described in Example X, in 30 cc. of dioxane, and the mixture was allowed to stand for 3 hours at room temperature. The excess of reagent was decomposed by addition of acetic acid, and then diluted with water. The product was extracted with ethyl acetate and the extract was washed with water, dried and evaporated. The solid residue was purified by crystallization from acetone-hexane to give the 3-benzoate-20-acetate of 16α-hydroxymethyl-Δ⁵-pregnene-3β,20β-diol.

A solution of the above compound in 10 cc. of pyridine was treated with 2 g. of tosyl chloride, and the mixture kept at 0° C. for 24 hours, poured into ice water, the formed precipitate collected, washed with water and dried, thus affording the 16α-hydroxymethyl-tosylate, 3-benzoate-20-acetate of Δ⁵-pregnene-3β,20β-diol.

A solution of 1 g. of the above compound in 20 cc. of dimethylformamide was treated with 1 g. of potassium hydrogen fluoride. The mixture was heated on the steam bath for 5 hours, poured into water, extracted with methylene chloride and the organic extract washed several times with water, dried over anhydrous sodium sulfate and evaporated to dryness. Crystallization from acetone-ether gave 16α-monofluoromethyl-Δ⁵-pregnene-3β,20β-diol 3-benzoate-20-acetate.

By following the methods of Examples VI, VII and VIII, the above compound was converted successively into 3β-benzoyloxy-16α-monofluoromethyl - Δ⁵ - pregnen-20β-ol; 3-benzoyloxy-16α-monofluoromethyl-Δ⁵-pregnen-20-one and 16α-monofluoromethyl-Δ⁵-pregnen-3β-ol-20-one. The latter compound was identical to that obtained in Example XIII.

We claim:

1. A compound of the following formula:

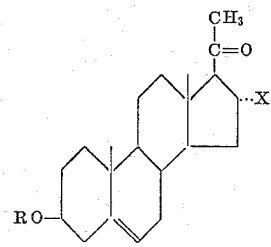

wherein R is selected from the group consisting of hydrogen and a hydrocarbon carboxylic acyl group of less than 12 carbon atoms and X is a difluoromethyl group.

2. 16α-difluoromethyl-Δ⁵-pregnen-3β-ol-20-one.
3. 16α - difluoromethyl-Δ⁵-pregnen-3β-ol-20-one benzoate.
4. 16α-difluoromethyl-Δ⁵-pregnen-3β-ol-20-one acetate.
5. A compound of the following formula:

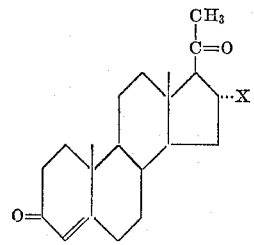

wherein X is selected from the group consisting of a difluoromethyl and a trifluoromethyl group.

6. 16α-difluoromethyl-progesterone.
7. 16α-trifluoromethyl-progesterone.
8. In the process of producing 16α-trifluoromethyl-Δ⁵-pregnen-3β-ol-20-one the steps comprising reducing 16α-cyano-3β-acyloxy-Δ⁵-pregnen-20-one with an alkali metal borohydride, etherifying the thus formed 16α-cyano-3β-acyloxy-Δ⁵-pregnen-20β-ol with dihydropyran, hydrolyzing the 20β-ether derivative with alcoholic alkali metal hydroxide to form the 20β-ether of Δ⁵-pregnene-3β,20β-diol-16α-carboxylic acid, benzoylating the latter product, hydrolyzing the ether group with dilute mineral acid, acylating the thus formed C–20β-hydroxyl group, treating the 3β-benzoyloxy-20β-acyloxy-Δ⁵-pregnene-16α - carboxylic acid with sulfur tetrafluoride, selectively hydrolyzing the thus formed 16α-trifluoromethyl-3β-benzoyloxy-20β-acyloxy-Δ⁵-pregnene with alcoholic alkali metal carbonate to form 16α-trifluoromethyl-3β-benzoyloxy - Δ⁵ - pregnen-20β-ol, and thereafter oxidizing with chromic acid and hydrolyzing with alcoholic metal hydroxide to form 16α-trifluoromethyl-Δ⁵-pregnen-3β-ol-20-one.

9. In the process of producing 16α-trifluoromethyl-Δ⁵-pregnen-3β-ol-20-one the step comprising heating 3β,20β-diacyloxy-Δ⁵-pregnene-16α-carboxylic acid with sulfur tetrafluoride.

10. The process of claim 9 wherein the reaction is maintained at 145° C. for five hours in a sealed tube.

11. The process of claim 9 wherein the reaction is maintained at 20° C. for 96 hours in a sealed tube.

12. The process of claim 9 wherein the 3α,20β-diacyloxy-Δ⁵-pregnene - 16α - carboxylic acid is 3β - benzoyloxy-20-acetoxy-Δ⁵-pregnene-16α-carboxylic acid.

13. In the process of producing 16α-difluoromethyl-Δ⁵-pregnen-3β-ol-20-one the steps comprising reducing 16α-cyano-3β-acyloxy-Δ⁵-pregnen-20-one with an alkali metal borohydride, etherifying the thus formed 16α-cyano-3β-acyloxy-Δ⁵-pregnen-20β-ol with dihydropyran, hydrolyzing the 20β-ether derivative with alcoholic alkali metal hydroxide to form the 20β-ether of Δ⁵-pregnene-3β,20β-diol-16α-carboxylic acid, benzoylating the latter product, hydrolyzing with ether group with dilute mineral acid, acylating the thus formed C–20β-hydroxyl group, treating the 3β-benzoyloxy-20β-acyloxy-Δ⁵-pregnene-16α - carboxylic acid with oxalyl chloride, reacting the thus formed 3β-benzoyloxy-20β-acyloxy-Δ⁵-pregnene-16α - carboxylic acid chloride with a reducing agent selected from the group consisting of lithium aluminum tertiary butoxide and hydrogen, treating the thus formed 3β-benzoyloxy-20β-acyloxy-Δ⁵-pregnene-16α-carboxaldehyde with sulfur tetrafluoride, selectively hydrolyzing the thus formed 16α-difluoromethyl-3β-benzoyloxy-20β-acyloxy - Δ⁵ - pregnene with alcoholic alkali metal carbonate to form 16α-difluoromethyl-3β-benzoyloxy-Δ⁵-pregnen-20β-ol and thereafter oxidizing with chromic acid and hydrolyzing with alcoholic alkali metal hydroxide to form 16α-difluoromethyl-Δ⁵-pregnen-3β-ol-20-one.

14. In the process of producing a 16α-difluoromethyl derivative of the pregnane series the step comprising reacting a 20β-acyloxy-Δ⁵ - pregnene - 16α - carboxaldehyde with an excess of sulfur tetrafluoride in an inert solvent.

15. In the process of producing 16α-monofluoromethyl-Δ⁵-pregnen-3β-ol-20-one the steps comprising reducing a 3,20-diacylate of Δ⁵-pregnene-3β,20-diol-16α-carboxaldehyde with sodium borohydride, forming the tosylate of the thus formed 3,20-diacylate of 16α-hydroxymethyl-Δ⁵-pregnene-3β,20-diol, reacting the tosylate with an alkali metal fluoride to form the corresponding 3,20-diacylate of 16α-monofluoromethyl-Δ⁵-pregnene - 3β,20β - diol and thereafter selectively hydrolyzing with alkali metal carbonate and oxidizing with chromic acid the last mentioned steroid to form the 3-acylate of 16α-monofluoromethyl-Δ⁵-pregnen-3β-ol-20-one.

References Cited in the file of this patent

UNITED STATES PATENTS 3,079,407  Sarett et al. _____ Feb. 26, 1963